US012565455B1

(12) United States Patent
Chen et al.

(10) Patent No.: US 12,565,455 B1
(45) Date of Patent: Mar. 3, 2026

(54) METAL-BASED COMPOSITES AND METHODS THEREFOR

(71) Applicant: Wisconsin Alumni Research Foundation, Madison, WI (US)

(72) Inventors: Lianyi Chen, Middleton, WI (US); Ali Nabaa, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/402,278

(22) Filed: Jan. 2, 2024

(51) Int. Cl.
     *B22D 19/14*          (2006.01)
     *C04B 41/51*          (2006.01)
(52) U.S. Cl.
     CPC .......... *C04B 41/51* (2013.01); *C04B 2235/94* (2013.01); *C04B 2235/95* (2013.01)
(58) Field of Classification Search
     CPC ................................ B22D 19/14; C04B 41/51

USPC ...................................... 164/46, 97; 118/716
See application file for complete search history.

(56)                References Cited

U.S. PATENT DOCUMENTS

2019/0032173 A1*    1/2019   Sherman et al. ... C22C 32/0073

* cited by examiner

*Primary Examiner* — Kevin P Kerns
(74) *Attorney, Agent, or Firm* — Mueting Raasch Group

(57)                ABSTRACT

Aspects of the disclosure are directed to methods, apparatuses and articles of manufacture pertaining to metal-based materials having particles dispersed therein. As may be implemented in accordance with various embodiments, ceramic particles are provided in a metal-based melt. The metal-based melt is heated to induce boiling and therein diffuse metal vapors of the metal-based melt between the ceramic particles. A liquid metal coating is formed on the ceramic particles by condensing the metal vapors onto surfaces of ceramic particles. In certain implementations, the metal vapors are used to generate pressure between the ceramic particles, which causes the particles to move/disperse relative to one another.

21 Claims, 7 Drawing Sheets

FIG. 2A

Stagnation region, High pressure

FIG. 2B

METAL-BASED COMPOSITES AND METHODS THEREFOR

BACKGROUND

Many applications involve introducing particles into liquid material, which may impart certain properties into the liquid material and/or to the particles. One such application involves adding ceramic or other particles to a molten metal or metal-based material. Such approaches may be useful, for example, in forming structures having a combination of materials. For instance, a nanocomposite material may include a matrix with microparticles and/or nanoparticles, which may improve a particular property of the matrix, such as to enhance strength or conductivity.

One type of matrix structure involves metal matrix nanocomposites that are a type of nanocomposite in which nanoparticles, such as ceramic nanoparticles, are added to a metal matrix. Such nanocomposites are desirable because they can be made from relatively inexpensive, abundant metals with strengths comparable to those of more expensive alloys.

While useful, processing particles into liquids, such as processing nanoparticles into metal alloys, can be challenging. For instance, particles may be clustered and challenging to disperse, which may result in an end product having non-uniform properties. These and other matters have presented challenges to the implementation of particles, such as to the formation of metal matrix composites, for a variety of applications.

SUMMARY

Various example embodiments are directed to ceramic particles, their application and manufacture, as well as apparatuses and articles of manufacture utilizing ceramic particles. Such embodiments may be useful, for example, in forming metal matrix nanocomposites. For instance, certain embodiments are directed to rapid boiling enabled wetting, incorporating and dispersing of particles in molten metal, as may be implemented for large scale processing of metal matrix nanocomposites.

As may be implemented in accordance with one or more embodiments, a method is carried out as follows. Ceramic particles are provided in a metal-based melt. The metal-based melt is heated to induce boiling, therein diffusing metal vapors of the metal-based melt between the ceramic particles. A liquid metal coating is formed on the ceramic particles by condensing the metal vapors onto surfaces of ceramic particles.

Another embodiment is directed to a method carried out as follows. Ceramic particles are provided in a metal-based melt, which is heated to induce boiling and therein diffuse metal vapors of the metal-based melt between the ceramic particles. The metal vapors are used to increase pressure between the ceramic particles, and the increased pressure is used to disperse the ceramic particles. In some implementations, a liquid metal coating is formed on the ceramic particles by condensing the metal vapors onto surfaces of ceramic particles.

Another embodiment is directed to an apparatus comprising a tube-like structure to pass a metal-based melt including ceramic particles, and heating circuitry including control circuitry programmed to operate the heating circuitry. Specifically, the heating circuitry is configured to heat the metal-based melt in the tube-like structure to induce boiling and therein diffuse metal vapors of the metal-based melt between the ceramic particles. This induced boiling further causes the formation of a liquid metal coating on the ceramic particles by condensing the metal vapors onto surfaces of ceramic particles. Pressure created between the ceramic particles via the diffused metal vapors is used to disperse the particles.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 2A-2E show an approach for dispersing particles, as may be implemented in accordance with one or more embodiments, and in which:

FIG. 2A depicts the introduction of vapors between particles,

FIG. 2B depicts an increase in local pressure between the particles,

FIG. 2C depicts localized condensation,

FIG. 2D depicts the formation of a thin liquid layer, and dispersion of the particles, and FIG. 2E depicts several such dispersed particles with an inset showing two such particles (e.g., as shown in FIGS. 2A-2D)

Figure 1:
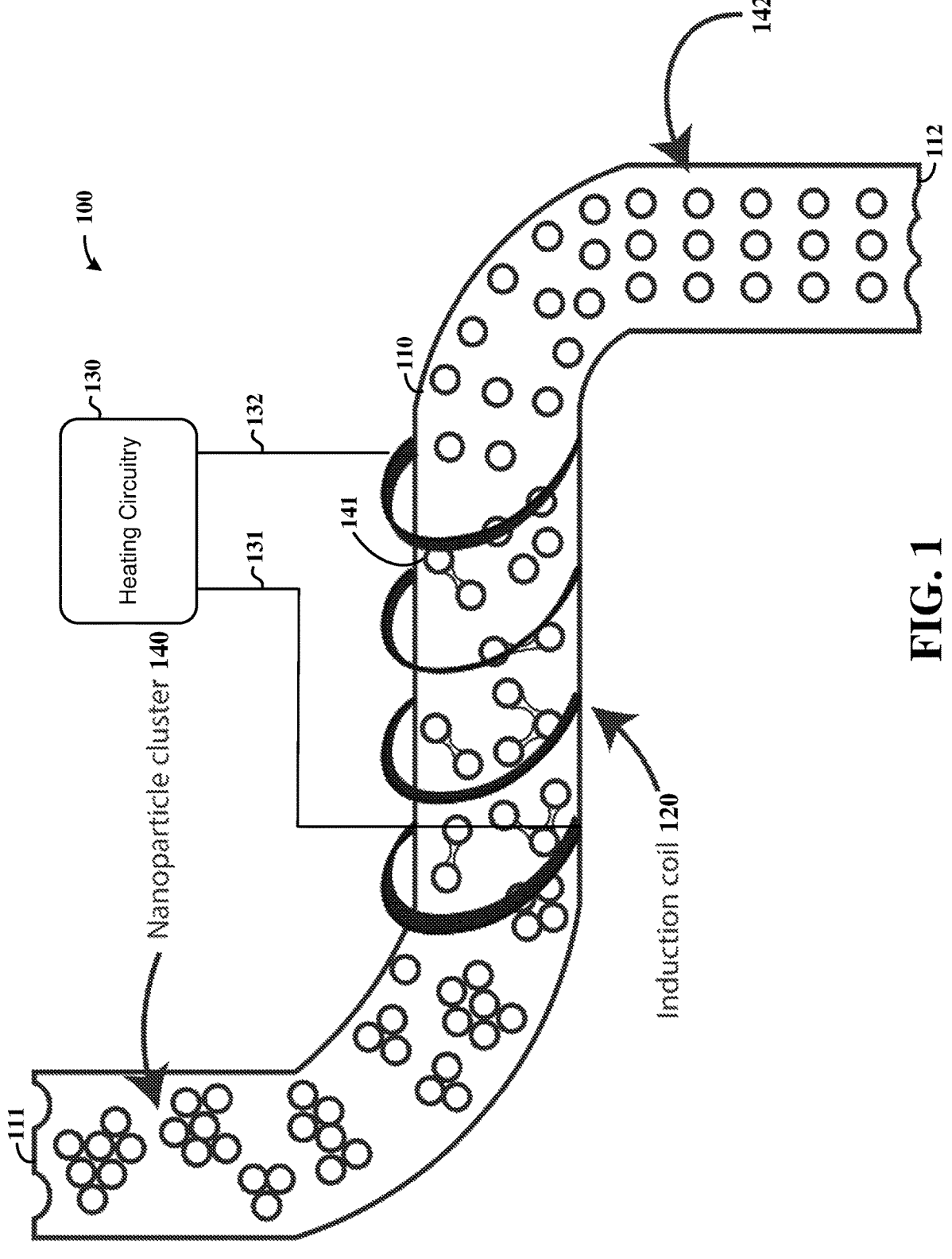
FIG. 1 shows an apparatus and approach involving the dispersion of particles, as may be implemented in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving ceramic particles, their processing and related structures. Various such approaches involve effectively wetting, incorporating and dispersing ceramic particles, such as microparticles and/or nanoparticles, into molten metal. In certain implementations, aspects of the present disclosure have been shown to be beneficial when used in the context of forming metal matrix composites with uniformly dispersed ceramic particles. While not necessarily so limited, various aspects may be appreciated through a discussion of examples using such exemplary contexts.

In accordance with one or more embodiments, ceramic particles are provided with a metal-based material that is (or has been) heated to induce boiling that causes metallic vapors to diffuse into gaseous bridges between the ceramic particles. The metal-based material includes one or more metals, and may include further materials. The vapors are utilized to disperse the ceramic particles within the metal-based material. For instance, where the ceramic particles are grouped in agglomerates, such an approach may be used to break up the agglomerates and disperse the ceramic particles.

In connection with such approaches, it has been recognized and/or discovered that gas-filled capillary bridges between particles within metallic matrices hinder particle wetting and promote agglomeration. It has further been recognized and/or discovered that a mass flux of vapor into a gaseous bridge, which may be induced by rapidly heating and boiling metal-based material, introduces pressure between the ceramic particles that causes them to disperse. Local high-pressure zones near the particle surface may be used to induce condensation of the metal vapor to form a liquid metal coating on the surface of the ceramic particles, which may fully wet the ceramic particles.

In some instances, the metal-based material is cooled (e.g., rapidly) to facilitate the vapor condensation. Such cooling may cause condensation of metal vapor to form a liquid metal thin film on the ceramic particles to achieve full wetting and dispersion.

Heating may be carried out in a variety of manners. For instance, heating the metal-based material may involve a single heating/boiling step, or may involve multiple (e.g., cyclic) heating and cooling steps. Induction heating may be used, for example, as the metal-based material and ceramic particles are flowing through a tube or other structure. One such implementation involves inductively heating and boiling molten metal having nanoparticle clusters therein, as the molten metal passes through a segment of a pipe for continuous casting of metal matrix nanocomposites.

Various embodiments are directed to methods for making specific apparatuses and/or articles of manufacture, as well as such apparatuses and/or articles of manufacture themselves. For instance, certain embodiments are directed to high strength, high conductivity cable for power transmission. Other embodiments are directed to conductive materials for motors, structural materials, and other components. A variety of different types of metal and particles may be utilized in accordance with the various embodiments herein. For instance, aluminum, copper, steel and other metals with similar or lower boiling points can be utilized.

In accordance with another embodiment, a method is carried out as follows. Ceramic particles are provided in a metal-based melt. This may involve, for example, introducing molten metal and mixing ceramic particles therein. The ceramic particles may include ceramic nanoparticles, ceramic microparticles, or a combination thereof. The shape of the particles may be, for example, round, angular, cylindrical, wire, a plate, a sheet, or a combination thereof. Certain implementations involve melting a metal-based material to provide the metal-based melt. The metal-based melt is heated to induce boiling, therein diffusing metal vapors of the metal-based melt between the ceramic particles. A liquid metal coating is formed on the ceramic particles by condensing the metal vapors onto surfaces of ceramic particles, for example by cooling the metal-based melt (e.g., with the ceramic particles dispersed therein). In certain implementations, the metal vapors are used to increase pressure between the ceramic particles, and the increased pressure is used to disperse the ceramic particles.

In some implementations, the metal vapors are diffused into gaseous bridges between the ceramic particles, and the liquid metal coating is formed by depositing the metal vapors onto the ceramic particles. Certain embodiments involve introducing a mass flux of vapor into gaseous bridges between the ceramic particles to increase pressure therein, and using the increased pressure to disperse the ceramic particles.

In a variety of applications, the ceramic particles in the melt may be coupled in conglomerates that each include a plurality of the ceramic particles held together by forces, such as those implied by capillary bridges and/or van der Waals forces between respective ones of the ceramic particles. The metal-based melt is sufficiently heated to cause diffused metal vapors to overcome the forces and disperse the particles.

The liquid metal coating may be formed in a variety of manners. In some implementations, the metal-based melt is cyclically heated and cooled, forming portions of the liquid metal coating during each cycle. In other implementations, the metal-based melt is continuously cast by heating and cooling the metal-based melt in an extrusion tube or in a continuous casting mold.

Another embodiment is directed to a method carried out as follows. Ceramic particles are provided in a metal-based melt, which is heated to induce boiling of the metal-based melt and therein diffuse metal vapors of the metal-based melt between the ceramic particles. The metal vapors are used to increase pressure between the ceramic particles, for example when the vapors collide and their velocity is reduced. This increased pressure is used to disperse the ceramic particles. In some implementations, a liquid metal coating is formed on the ceramic particles by condensing the metal vapors onto surfaces of ceramic particles.

Another embodiment is directed to an apparatus comprising a tube-like structure to pass a metal-based melt including ceramic particles, and heating circuitry including control circuitry programmed to operate the heating circuitry. Specifically, the heating circuitry is configured to heat the metal-based melt in the tube-like structure to induce boiling and therein diffuse metal vapors of the metal-based melt between the ceramic particles. This induced boiling further causes the formation of a liquid metal coating on the ceramic particles by condensing the metal vapors onto surfaces of ceramic particles. Pressure created between the ceramic particles via the diffused metal vapors is used to disperse the particles.

The heating circuitry may be implemented in a variety of manners. In some embodiments, the heating circuitry includes an inductive coil configured to heat the metal-based melt within the tube-like structure and therein induce the boiling as the metal-based melt is passed through the inductive coil. The heating circuitry may be configured to cyclically heat and cool the metal-based melt as it passes through the tube-like structure, therein forming portions of the liquid metal coating during each cycle.

In some implementations, the apparatus includes a heating chamber to provide the ceramic particles in the metal-based melt to the tube-like structure. The heating chamber may be positioned to receive and deliver the metal-based melt, or may include heating componentry (e.g., conductive or inductive coils) to melt metal and therein form the metal-based melt.

The metal-based melt with dispersed ceramic particles (e.g., with the particles being coated) may be processed in a variety of manners. For instance, the apparatus may include an extrusion tube or a casting mold coupled to receive and extrude the metal-based melt with the dispersed ceramic particles. Further processing components, such as rollers or other metal processing components, may further be included.

Turning now to the figures, FIG. 1 shows an apparatus 100 for providing dispersion of particles, in accordance with another embodiment. The apparatus 100 includes a tube-like structure 110 (e.g., a pipe) having an inlet 111 for receiving a metal-based material with particle clusters, and an outlet 112 via which the metal-based material is passed after the particles have been dispersed. The apparatus 100 also includes an induction coil 120, which provides inductive heat for heating the metal-based material. Alternate embodiments include other types of heat sources, for example a conductive heat source, which may be used as an alternate to or in connection with the induction coil 120. In some implementations, heating circuitry 130 may be utilized to control the induction coil 120 (or another type of heat source), such as by applying current to the induction coil 120 via conductors 131 and 132.

Metal-based material having nanoparticle clusters, such as cluster 140, may be introduced to the apparatus via the inlet 111. The induction coil 120 rapidly heats the metal-based material as it passes by the induction coil, generating metal vapors that are introduced between the nanoparticles in the clusters. This causes localized increases in pressure between the particles in the clusters, as well as condensation of metal vapor onto the particles. The rapid heating (e.g., 100-1,000,000,000 K/s) can be implemented as a one-time heating, or cyclic rapid heating and cooling, which may be programmed/controlled by heating circuitry 130. Referring to particle 141 by way of example, separation of this particle from an adjacent particle is shown in the vicinity of the induction coil 120, as driven by metal vapors. Further, metal vapor is condensed on particle 141 to wet the particle. As shown further downstream, this approach provides the metal-based material with nanoparticles that are well dispersed therein.

In some embodiments, the apparatus 100 is configured to provide continuous casting of metal matrix nanocomposites with uniform dispersion of ceramic particles. The nanoparticle clusters (including 140) are provided as ceramic particle clusters within a metal-based metal bases liquid material to the inlet 111. The induction coil 120 rapidly heats the metal-based material, for instance at rates of (100-1,000, 000,000 K/s) to boiling, which disperses the ceramic nanoparticles and further wets the surfaces of the nanoparticles with condensed metal from the metal vapors. After passing through the induction coil 120, flowing molten metal with dispersed nanoparticles 142 is passed/extruded through the outlet 112, to provide for continuous casting of metal matrix nanocomposites. This approach may be implemented for many applications, such as in producing high strength, high conductivity cable for power transmission.

FIGS. 2A-2E show an approach for dispersing particles, as may be implemented in accordance with one or more embodiments. This approach may involve breaking gas-filled capillary bridges between particles within metallic matrices, which may otherwise hinder particle wetting and promote agglomeration. Liquid metal is heated above its boiling temperature for a brief period until significant changes in the liquid phase dynamics disrupt the capillary bridge. When the liquid metal reaches its boiling point, a phase transition occurs, converting the liquid metal into metallic vapors along the bridge interface shown in FIG. 2A. Of note, the following discussion of these figures refers to dispersing ceramic particles in a liquid metal-based material.

However, a variety of types of particles and liquids maybe utilized, to suit particular embodiments.

Figure 2A:
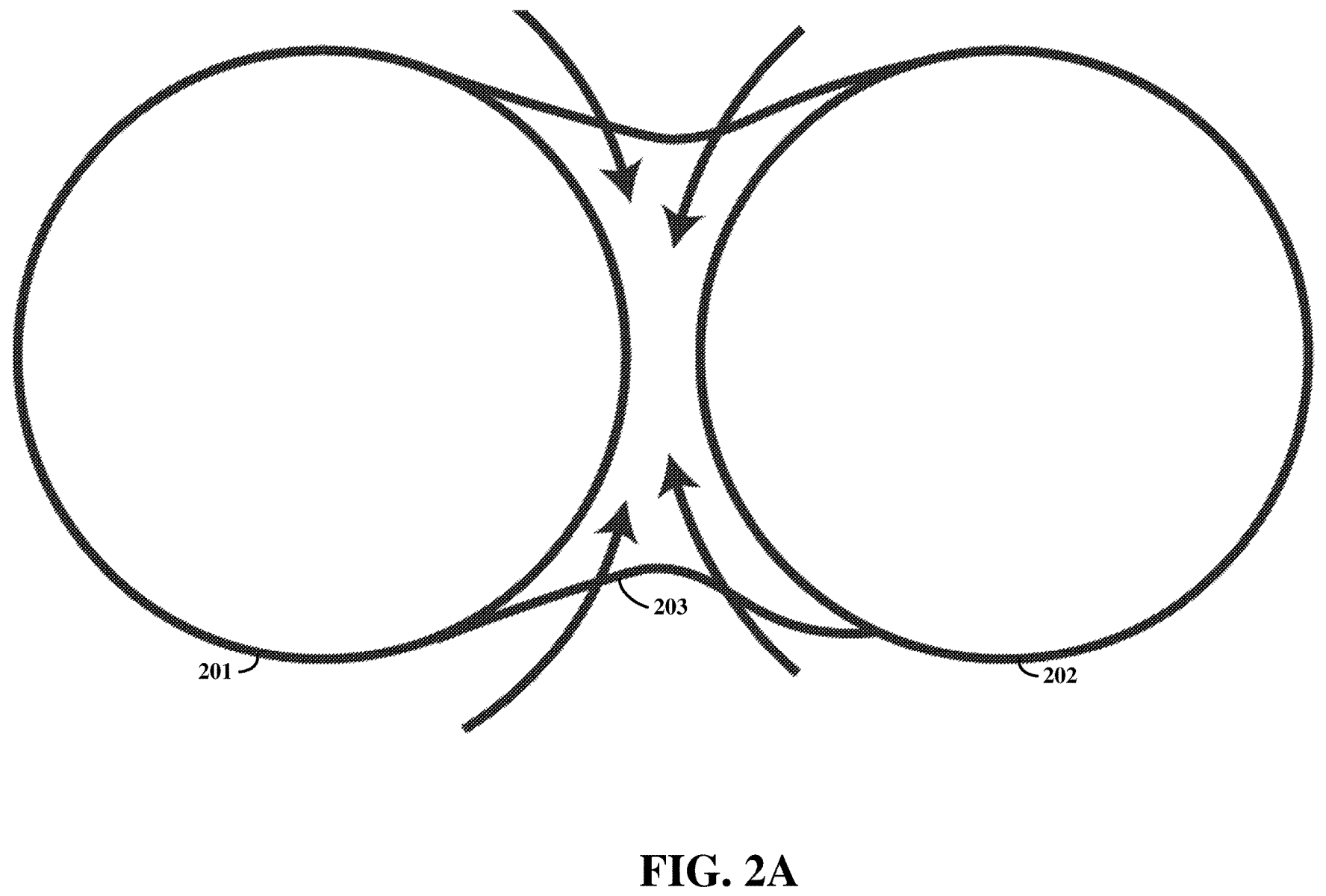

Referring to FIG. 2A, metal vapors are introduced into a region 203 between ceramic particles 201 and 202, as shown by way of example with representative arrows. This may involve boiling a metal-based material in which the particles are provided, to produce the metal vapors. These vapors are utilized for creating a high pressure zone between the particles, for example by seeping evaporated gasses between the particles until they collide, in which the velocity of the gasses at the midpoint may become zero and therein generate high pressure due to low (or zero) velocity, which in turn breaks forces holding the particles together (e.g., capillary and/or van der Waals forces) and disperses the particles.

Figure 2B:
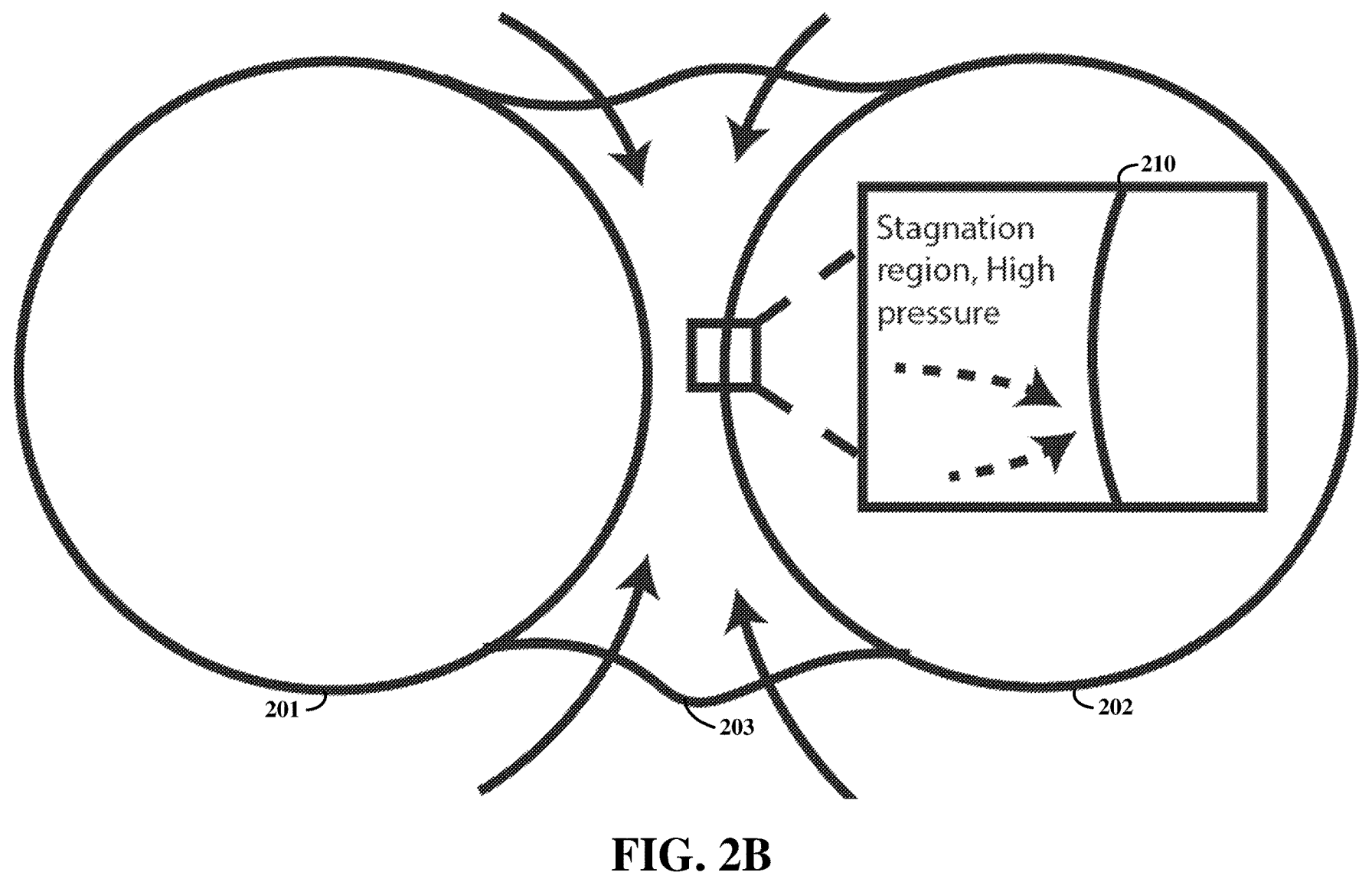

FIG. 2B shows a stagnation region at inset 210 where an increase in local pressure has been created between the particles 201 and 202, via the introduction of the metal vapors. As discussed above, this may involve heating/boiling metal to introduce metal vapors into the region between particles to produce high pressure. Due to radial concentration gradients directed toward the center of capillary bridges, metallic vapors begin to flow radially inward. An approximately equal mass flux of phase change from both the upper and lower sides of the bridges may cause the metallic vapor flow to converge at a central stagnation point within the bridge. Consequently, an increase in local pressure is induced at the center, surpassing the saturation pressure.

Figure 2C:
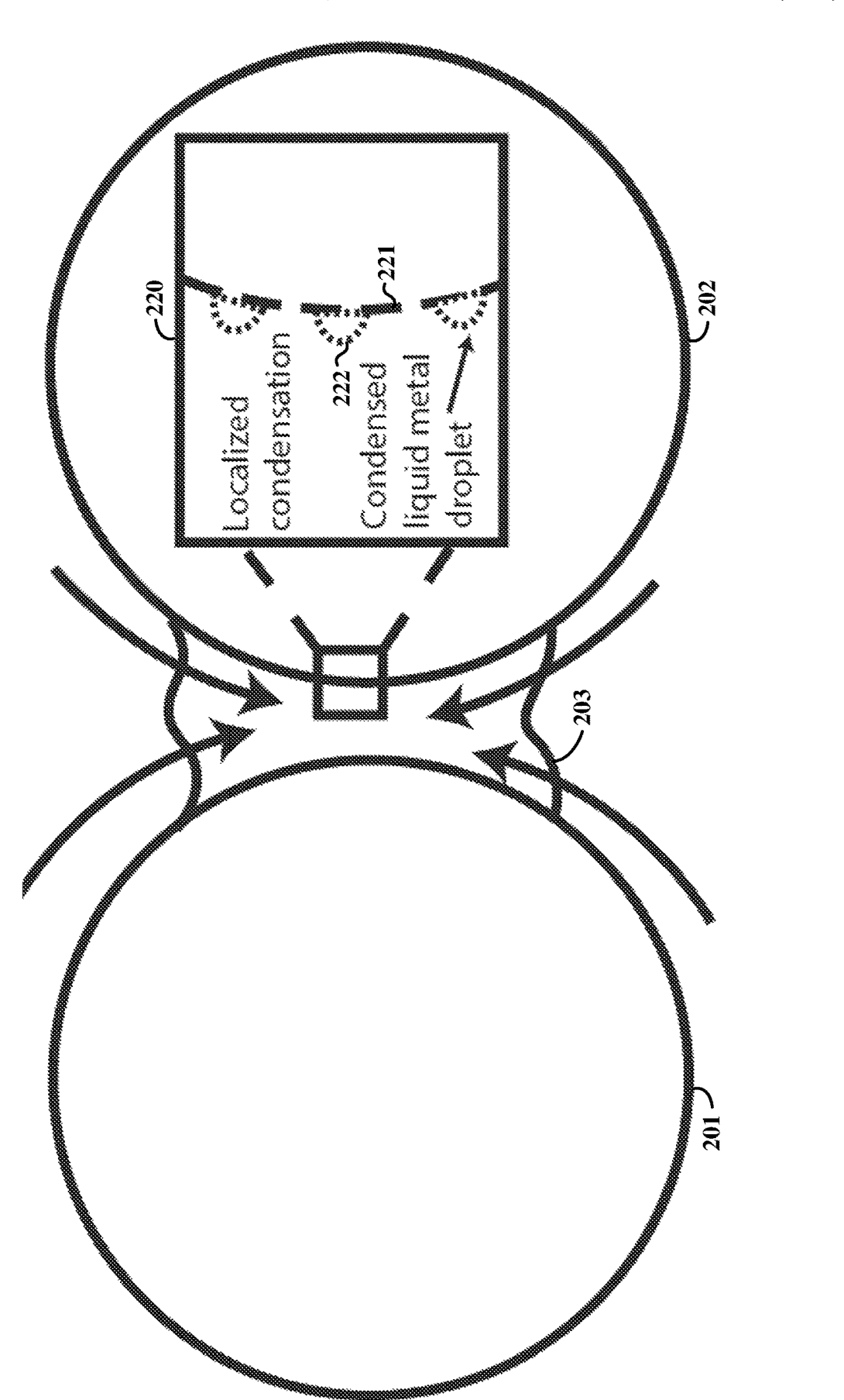

FIG. 2C depicts localized condensation at inset 220, caused by the aforementioned pressure, with a liquid-solid interface 221 depicted with a dashed line, and a liquid-gas interface 222 depicted by dotted lines where condensed metal liquid droplets are formed. The liquid-solid interface 221 may initiate wetting of the particles 201 and 202, as the pressure builds between them.

Figure 2D:
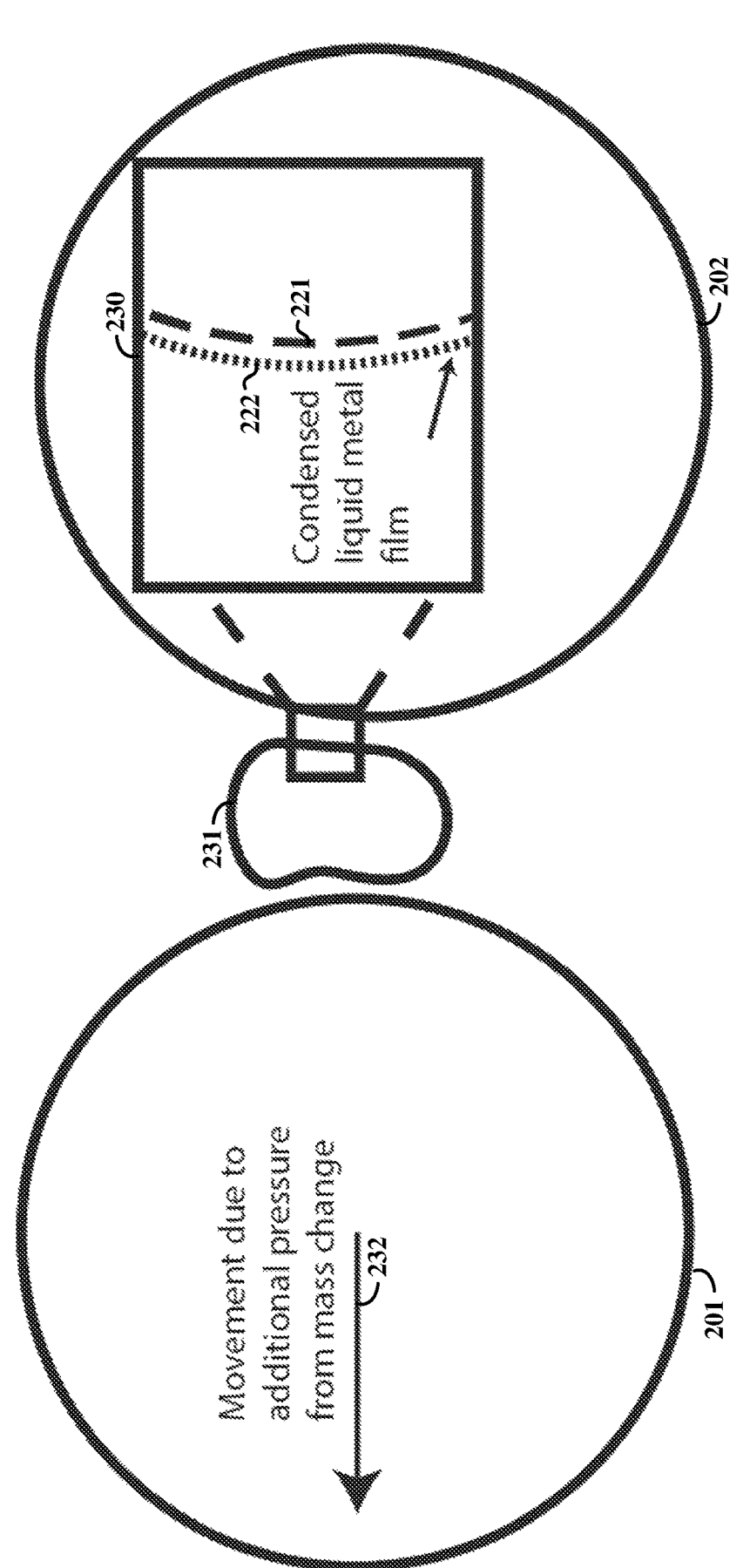

FIG. 2D depicts the formation of a thin liquid layer at the liquid-gas interface 222 as shown with inset 230, in which the condensed metal liquid droplets further wet the particles 201 and 202, forming a layer thereupon along the solid-liquid interface 221. Pressure in region 231 facilitates separation of the particles 201 and 202, with particle 201 depicted as moving in a direction shown by arrow 232. Particle 202 may also be driven away by the increased pressure, such that the respective particles move away from one another. For instance, non-uniform pressure may locally act as a repulsive force. The phase change rate is sufficiently high to overcome forces such as attractive van der Waals forces and capillary pressure, aiding in the breakup of nanoparticle clusters.

Figure 2E:
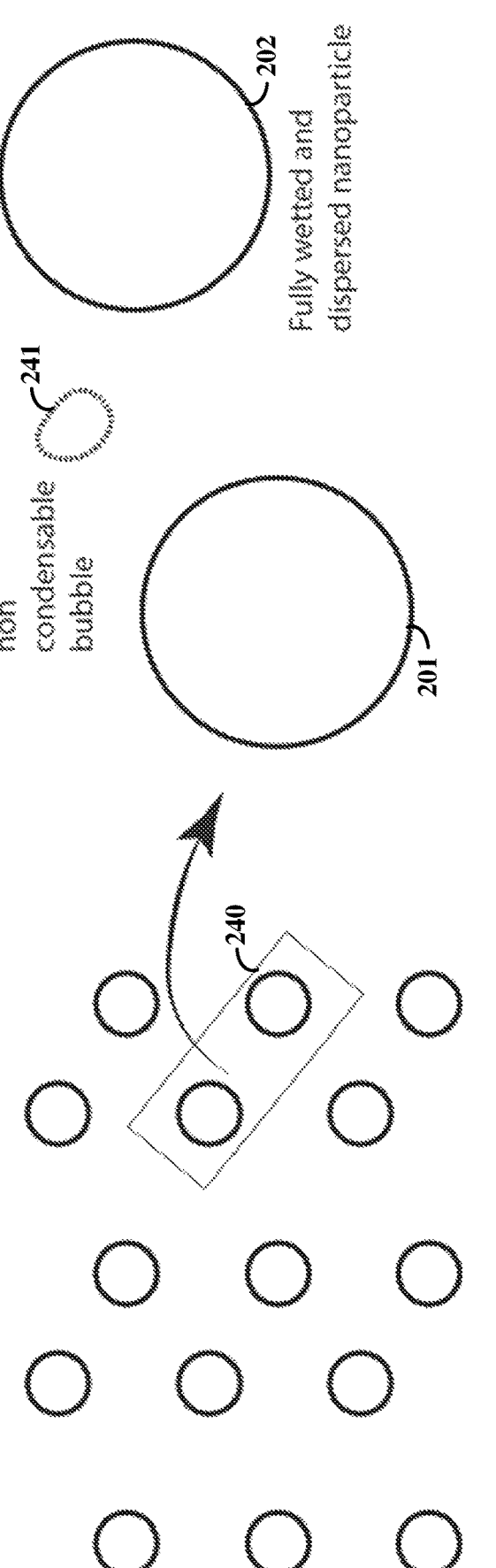

Through continuous local condensation at the solid-gas interface, these droplets are combined to form the thin liquid metal, ultimately resulting in complete wetting of the particles as seen in FIG. 2E. Specifically, FIG. 2E depicts several such dispersed particles with an inset showing two such particles 201 and 202 as well as non-condensable bubble 241 from inset 240, as shown in FIGS. 2A-2D. This dispersion may, for example, be implemented in connection with the apparatus 100 shown in FIG. 1, in which the particles are similarly dispersed to produce a relatively uniform dispersion of the particles at the outlet.

Figure 3:
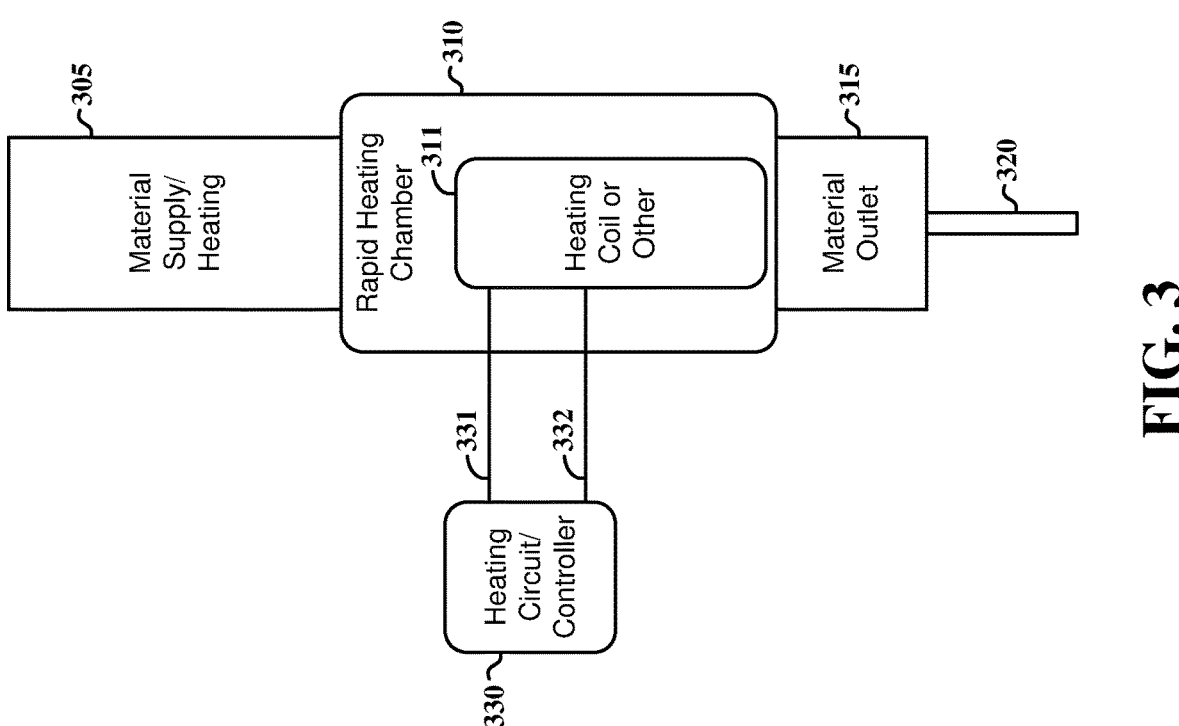
FIG. 3 shows an apparatus for producing metal matrix materials with particles dispersed therein, as may be implemented in accordance with another example embodiment.

FIG. 3 shows an apparatus 300 for producing metal matrix materials with particles dispersed therein, as may be implemented in accordance with another example embodiment. The apparatus 300 includes a material supply/heating chamber 305 for providing molten metal with one or more types of particles added therein. The material supply/heating chamber 305 may include, for example, a material receiver such as a hopper or other structural component for receiving metal powder or other form of metal, and a heating circuit such as a resistive or inductive coil, for melting the metal. In other implementations, the material supply/heating chamber 305 may receive molten metal having particles therein and/or to which particles may be added. In further implementations, the material supply/heating chamber 305 may include a screw or other component that conveys the metal forward and through the apparatus.

The apparatus 300 also includes a rapid heating chamber 310, having a heating coil (e.g., inductive, resistive, or other heating component) 311 that rapidly heats molten metal received from the material supply/heating component 305, for generating metal vapor as characterized herein. A heating circuit/controller 330 is coupled via conductors 331 and 332 for operating the heating coil 311, and controlling the generation of metal vapor and utilization thereof. For instance, the heating circuit/controller 330 may include a computer programmed to generate metal vapor that seeps between ceramic nanoparticles for generating regions of high pressure therein, dispersing the particles. The metal vapor may further be used to wet the metal particles, via condensation of the vapors onto the particles to form a metal coating thereupon.

Metal material with dispersed (and coated) particles therein is passed via material outlet 315, such as a nozzle type structure, a continuous casting mold, or an extrusion tube, and the metal material 320 is dispensed therefrom. Such an approach may be utilized to form metal wire and/or metal castings. The material 320 is further processed in accordance with wire or other manufacturing requirements, to suit particular applications.

Based upon the above discussion and illustrations, those skilled in the art will readily recognize that various modifications and changes may be made to the various embodiments without strictly following the exemplary embodiments and applications illustrated and described herein. For example, disparate types of metal or other liquid material may be utilized, and a variety of types of particles (ceramic and non-ceramic) may be utilized as well. Different types of heating may be applied for generating metal vapor, for instance resistive heating, radiative heating or others, may be utilized. Such modifications do not depart from the true spirit and scope of various aspects of the invention, including aspects set forth in the claims.

What is claimed is:
1. A method comprising:
providing ceramic particles in a metal-based melt;
heating the metal-based melt to induce boiling and therein diffusing metal vapors of the metal-based melt between the ceramic particles; and
forming a liquid metal coating on the ceramic particles by condensing the metal vapors onto surfaces of the ceramic particles.
2. The method of claim 1, wherein:
diffusing the metal vapors includes diffusing the metal vapors into gaseous bridges between the ceramic particles; and
forming the liquid metal coating includes depositing the metal vapors onto the ceramic particles.
3. The method of claim 1, wherein forming the liquid metal coating includes introducing a mass flux of vapor into gaseous bridges between the ceramic particles to increase pressure therein, and using the increased pressure to disperse the ceramic particles.

4. The method of claim 1, wherein:
the ceramic particles in the melt are coupled in conglomerates that each include a plurality of the ceramic particles held together by forces implied by capillary bridges between respective ones of the ceramic particles; and
heating the metal-based melt includes using the diffused metal vapors to disperse the particles.
5. The method of claim 1, wherein:
the ceramic particles in the melt are coupled in conglomerates that each include a plurality of the ceramic particles held together by forces implied by van der Waals forces between respective ones of the ceramic particles; and
heating the metal-based melt includes using the diffused metal vapors to disperse the particles.
6. The method of claim 1, wherein:
the ceramic particles in the melt are coupled in conglomerates that each include a plurality of the ceramic particles held together by forces implied by capillary bridges and van der Waals forces between respective ones of the ceramic particles; and
heating the metal-based melt includes using the diffused metal vapors to disperse the particles.
7. The method of claim 1, wherein heating the metal-based melt and forming the liquid metal coating includes cyclically heating and cooling the metal-based melt, and forming portions of the liquid metal coating during each cycle.
8. The method of claim 1, wherein heating the metal-based melt and forming the liquid metal coating includes continuously casting the metal-based melt by heating and cooling the metal-based melt in an extrusion tube.
9. The method of claim 1, wherein heating the metal-based melt and forming the liquid metal coating includes continuously casting the metal-based melt by heating and cooling the metal-based melt in a continuous casting mold.
10. The method of claim 1, wherein:
the ceramic particles include particles selected from the group of ceramic nanoparticles, ceramic microparticles, and a combination thereof; and
the ceramic particles have a shape selected from the group of round, angular, cylindrical, wire, plate, sheet, and a combination thereof.
11. The method of claim 1, wherein condensing the metal vapors onto surfaces of ceramic particles includes cooling the metal-based melt with the ceramic particles dispersed therein.
12. The method of claim 1, further including using the metal vapors to increase pressure between the ceramic particles, and using the increased pressure to disperse the ceramic particles.
13. A method comprising:
providing ceramic particles in a metal-based melt;
heating the metal-based melt to induce boiling and therein diffusing metal vapors of the metal-based melt between the ceramic particles; and
using the metal vapors to increase pressure between the ceramic particles, and using the increased pressure to disperse the ceramic particles.
14. The method of claim 13, further including forming a liquid metal coating on the ceramic particles by condensing the metal vapors onto surfaces of the ceramic particles.
15. The method of claim 1, wherein:
providing the ceramic particles in the metal-based melt includes providing the ceramic particles in a tube-like structure;

heating the metal-based melt to induce boiling and therein diffusing metal vapors of the metal-based melt between the ceramic particles includes using heating circuitry, including control circuitry programmed to operate the heating circuitry, to heat the metal-based melt in the tube-like structure; and forming the liquid metal coating on the ceramic particles by condensing the metal vapors onto surfaces of ceramic particles includes operating the heating circuitry to facilitate the condensing of the metal vapors and to further disperse the ceramic particles by increasing pressure between the ceramic particles via the diffused metal vapors.

16. An apparatus comprising:

a tube-like structure to pass a metal-based melt including ceramic particles; and heating circuitry, including control circuitry programmed to operate the heating circuitry to:

heat the metal-based melt in the tube-like structure to induce boiling and therein diffuse metal vapors of the metal-based melt between the ceramic particles;

form a liquid metal coating on the ceramic particles by condensing the metal vapors onto surfaces of ceramic particles; and disperse the ceramic particles by increasing pressure between the ceramic particles via the diffused metal vapors.

17. The apparatus of claim 16, wherein the heating circuitry includes an inductive coil configured to heat the metal-based melt within the tube-like structure and therein induce the boiling as the metal-based melt is passed through the inductive coil.

18. The apparatus of claim 16, further including a heating chamber to provide the ceramic particles in the metal-based melt to the tube-like structure.

19. The apparatus of claim 16, wherein the heating circuitry is configured to cyclically heat and cool the metal-based melt as it passes through the tube-like structure, therein forming portions of the liquid metal coating during each cycle.

20. The apparatus of claim 16, further including an extrusion tube coupled to receive and extrude the metal-based melt with the coated ceramic particles.

21. The apparatus of claim 16, further including a casting mold coupled to receive and cast the metal-based melt with the coated ceramic particles.

* * * * *